United States Patent [19]

Wagner

[11] Patent Number: 4,993,522

[45] Date of Patent: Feb. 19, 1991

[54] HYDRAULICALLY BLOCKABLE GAS SPRING

[75] Inventor: Udo Wagner, Dachsenhausen, Fed. Rep. of Germany

[73] Assignee: Stabilus GmbH, Koblenz-Neuendorf, Fed. Rep. of Germany

[21] Appl. No.: 468,710

[22] Filed: Jan. 23, 1990

[30] Foreign Application Priority Data

Feb. 1, 1989 [DE] Fed. Rep. of Germany ....... 3902882

[51] Int. Cl.$^5$ .............................. F16F 9/06; F16F 9/46
[52] U.S. Cl. ..................................... 188/269; 188/299; 188/300; 267/64.12
[58] Field of Search ....................... 188/269, 299, 300; 267/64.12, 113, 120, 121

[56] References Cited

U.S. PATENT DOCUMENTS

| | | | |
|---|---|---|---|
| 3,388,883 | 6/1968 | Axthammer et al. | 248/188.2 |
| 3,426,651 | 2/1969 | Arendarski | 267/64.12 X |
| 3,979,109 | 9/1976 | Ishida | 293/124 |
| 4,373,707 | 2/1983 | Mölders | 267/64.12 |
| 4,709,790 | 12/1987 | Freitag et al. | 188/300 |
| 4,784,375 | 11/1988 | Wirges | 267/64.12 |
| 4,785,921 | 11/1988 | Hosan et al. | 188/300 |

FOREIGN PATENT DOCUMENTS

| | | |
|---|---|---|
| 1554258 | 5/1969 | Fed. Rep. of Germany . |
| 1554201 | 7/1971 | Fed. Rep. of Germany . |
| 8500855 | 5/1985 | Fed. Rep. of Germany . |
| 2169685 | 7/1986 | United Kingdom ................ 188/300 |

Primary Examiner—Robert P. Olszewski
Assistant Examiner—A. Muratori
Attorney, Agent, or Firm—Brumbaugh, Graves, Donohue & Raymond

[57] ABSTRACT

In a hydraulically blockable gas spring a hydraulic chamber and a gas chamber are provided one behind the other within a cylinder. The chambers are separated from each other by a separating wall. A first section of a piston rod is sealingly guided through one end of the hydraulic fluid chamber and is connected with a separating piston within the hydraulic fluid chamber. The separating piston divides the hydraulic fluid chambers into two hydraulic fluid compartments. The fluid compartments are interconnected by a hydraulic flow path. The hydraulic flow path can be selectively opened and closed by a valve. A second piston rod section extends from the separating piston through the separating wall and sealingly enters into the gas chamber. The pressurized gas within the gas chamber provides a biasing action onto the second piston rod section. The hydraulic chamber is completely filled with a hydraulic fluid. When the valve is closed, the separating piston and the piston rod sections are positively blocked in both axial directions. When the valve is open, the separating piston and the piston rod sections can be moved as a unit and are subject to the biasing action of the pressurized gas.

14 Claims, 1 Drawing Sheet

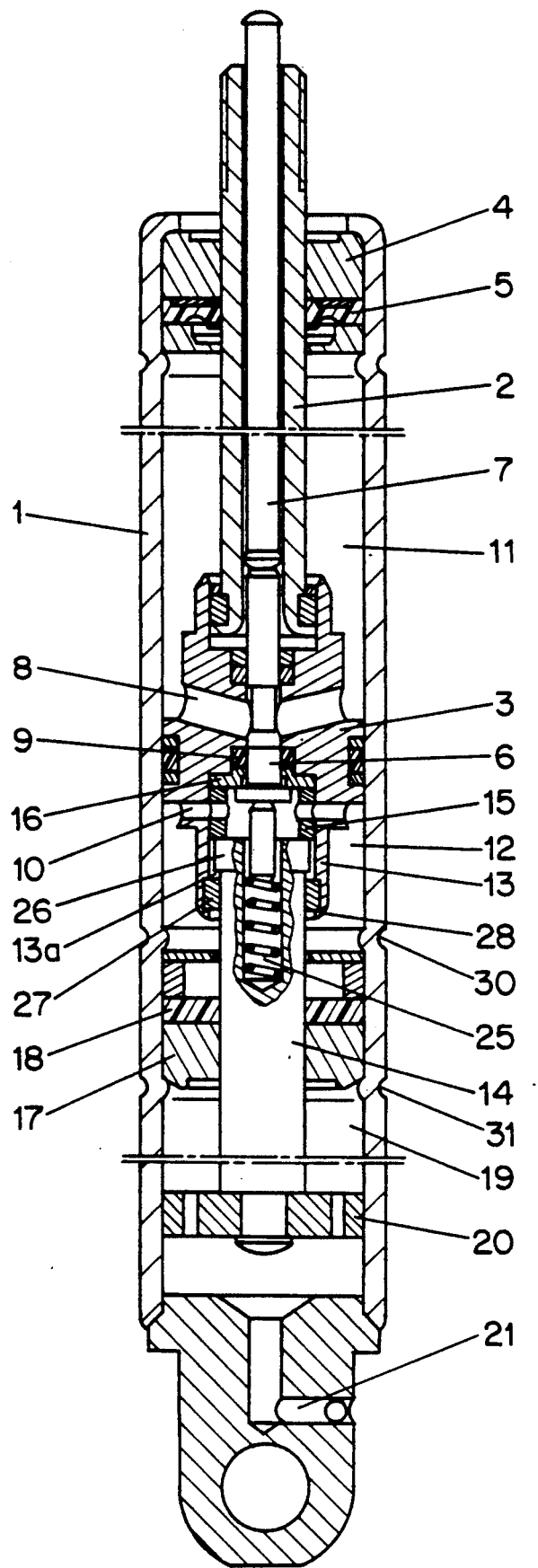

HYDRAULICALLY BLOCKABLE GAS SPRING

BACKGROUND OF THE INVENTION

This invention relates to the field of blockable gas springs which may be used as positioning devices, e.g. for the head adjustment of a steering column in a motor vehicle. If a gas spring is used as a positioning element, it is desirable on the one hand that the adjusting movement in one direction occurs automatically as a result of the biasing action of a pressurized gas. On the other hand, it is also desirable that in an adjusted condition, the length of the gas spring is unvariable against axial forces in both axial directions.

STATEMENT OF THE PRIOR ART

German Publication No. 1,554,201 shows a gas spring, where a separator wall arranged displaceably on the inner wall of a cylinder is provided as separator element between a hydraulic chamber and a gas-filled spring chamber. The hydraulic chamber is divided by a piston connected with a piston rod into two compartments which are connectable with one another through a blocking valve which can be actuated at will from the exterior. The blocking valve comprises a through-flow passage situated in the piston, which passage cooperates with a valve body and is actuatable from the exterior by means of a valve plunger situated in a piston rod bore. In the direction of traction of the piston rod, a hydraulic blocking is effective even for high traction forces, while in the compression direction of the piston rod the blocking is limited by the gas pressure in the spring chamber. Accordingly, in the case of higher pressure forces acting upon the piston rod, the hydraulic blocking is overcome and an inward movement of the piston rod takes place.

A positioning element with hydraulic blocking is known from German Gebrauchsmuster No. 8,500,855; this positioning element has no spring action.

OBJECT OF THE INVENTION

It is the object of the present invention to provide a hydraulically blockable gas spring in which the piston rod-piston unit is biased in axial direction by a pressurized gas, if an adjustment is to be performed, and in which on the other hand the axial position of the piston rod with respect to the cylinder can be positively blocked in both axial directions, after a desired adjustment has been performed. Moreover, it is desired that the gas spring can be easily manufactured and allows easy adjustment of the spring force. Manufacturing and assembling should be possible at favorable cost.

SUMMARY OF THE INVENTION

A hydraulically blockable gas spring comprises a cylinder member having an axis. A hydraulic fluid chamber is confined within the cylinder member. This hydraulic fluid chamber has a first end and a second end axially opposite each other. An axially extending first piston rod section is sealingly guided through the first end of the hydraulic fluid chamber. The first piston rod section is connected with a piston member within the hydraulic fluid chamber. The first piston rod section and the piston member provide a piston rod-piston unit axially movable with respect to the cylinder member. The piston member defines two hydraulic fluid compartments within the hydraulic fluid chamber. The hydraulic fluid chamber is filled with a hydraulic fluid, such as oil. The hydraulic fluid compartments are interconnectable by hydraulic fluid passage means. A valve unit is allocated to the hydraulic fluid passage means for selectively opening and closing the hydraulic fluid passage means. The valve unit is actuatable by external actuating means from outside said hydraulic fluid chamber. The piston rod-piston unit is subject to the biasing action of a volume of pressurized gas. This volume of pressurized gas is confined within a gas chamber adjacent the second end of the hydraulic fluid chamber. The gas chamber is separated from the hydraulic fluid chamber by a separating wall. The separating wall is axially fixed with respect to the cylinder member. The piston rod-piston unit is provided with a second piston rod section sealingly guided through the separating wall. The second piston rod section is exposed to the pressure of pressurized gas within the gas chamber.

In a most compact embodiment, the hydraulic fluid passage means extend through the piston piston rod unit, and the valve unit is actuatable via an axial bore extending through the first piston rod section. For obtaining a compact design, it is further desirable that the gas chamber is accommodated within the cylinder member. In this case, the separating wall may be axially fixed within the cylinder member by radially inwardly directed deformations of said cylinder member.

The second piston rod section may be provided with a damper piston within the gas chamber. By such a damper piston the movement of the piston rod-piston unit may be damped, when the valve unit is opened. The damping action may be variable in response to the direction of movement. The damper piston may additionally have a guiding function by guiding engagement with the inner wall surface of the gas chamber and more particularly of the cylinder member.

In order to easily adapt a spring force of the gas spring to the intended use, it is desirable that a separate filling opening is provided for filling the gas chamber with pressurized gas. This means that the pressure of the gas within the gas chamber can be adapted after the gas spring has been completely assembled, and after the hydraulic fluid has been filled into the hydraulic fluid chamber. The filling of the hydraulic fluid into the hydraulic fluid chamber may be performed during assembly of the gas spring or by a further filling opening in communication with the hydraulic fluid chamber. By way of example, the hydraulic fluid may be introduced into the hydraulic fluid chamber through the passage of an end wall through which the first piston rod section extends, if a sealing element allocated to this passage acts as a check valve.

If the gas chamber is accommodated within the cylinder member, the gas chamber may be closed at the end thereof axially remote from the separating wall by a closure member connected with the cylinder member. This closure member may be provided with a filling opening for filling said pressurized gas into said gas chamber. The closure member may be provided with a fastening element for fastening the gas spring to a respective construction.

While the second piston rod section may be integral with the first piston rod section, a most easy construction is obtained, if the second piston rod section is separate from the first piston rod section and is secured to the piston member. In this case, the second piston rod section may have an end portion received with an axially directed bore of the piston member. This bore may be e.g. provided within a tubular extension of the piston member. If the hydraulic fluid passage means extend through said axially directed bore, the end portion of the second piston rod section may rest on a spacer sleeve within the axially directed bore, and this spacer sleeve may be provided with radial bores forming part of the hydraulic fluid passage means. If the valve unit comprises a valve member received by an axially directed valve channel within the cylinder member, if further this valve channel opens into the axially directed bore, and if a sealing element for this valve channel surrounds the valve member, the sealing element may be axially fixed within the piston member by an abutment plate, and this abutment plate may be axially fixed by the spacer sleeve.

In order to make the volume of the hydraulic fluid chamber constant, irrespective of the axial position of the piston rod-piston unit, it is desirable that the first and the second piston rod have identic diameter.

The various features of the invention are discussed especially in the accompanying claims which form a part of the disclosure. For the better understanding of the invention, its working advantages and specific effects, reference is now made to the accompanying drawing and the description, in which a preferred form of embodiment of the invention is discussed.

BRIEF DESCRIPTION OF THE DRAWINGS

The invention is represented in the accompanying drawing and will be described in greater detail now.

DETAILED DESCRIPTION OF THE PREFERRED EMBODIMENT

The Figure shows a hydraulically blockable gas spring according to the invention in longitudinal section. Here a piston 3 connected with a first piston rod section 2 is axially movably guided in a cylinder 1, the first piston rod section 2 being guided in a piston rod guide unit 4 and sealed off to the exterior by a piston rod seal unit 5. A hydraulic fluid passage extends within the piston 3 between bores 8 and bores 10 connecting the compartments 11 and 12. A blocking valve unit comprises a valve pin 6 and an actuating plunger 7 situated in the tubular piston rod section 2. The valve pin 6 can be displaced axially by means of this actuating plunger 7 against the action of a valve spring 25. When a section with smaller diameter of the valve pin 6 travels over a seal element 9, a liquid-conducting connection is obtained between the compartment chambers 11 and 12. When the blocking valve unit is closed, as shown by the Figure, the seal element 9 lies in sealing manner on the valve pin 6, and the piston rod-piston unit is hydraulically blocked, that is to say that no liquid exchange can take place between the upper compartment chamber 11 and the lower compartment chamber 12.

At the lower end of the piston 3 there is a projection 13 with a bore 13a, in which a second piston rod section 14 is secured by a radially enlarged end portion 26, an abutment ring 27 and an inwardly curled zone 28 of the projection 13. The second piston rod section 14 rests on a spacer sleeve 15 which is pressed against an abutment plate 16. With the aid of this abutment plate 16, a chamber for the seal element 9 is limited. The separating wall 17 is fixed axially in the cylinder 1 by means of corrugations 30,31 and is penetrated by the second piston rod section 14. The second piston rod section 14 extends into a gas chamber 19 which has a gas filling under pressure and is sealed off from the fluid-filled lower compartment 12 by a seal 18 for the second piston rod section 14. The pressure of the gas filling in the gas chamber 19 determines the outward thrust force of the first piston rod section 2, when the blocking valve is opened. In the production of the gas spring, by way of example, the gas filling can be adjusted quite easily, according to the desired purpose of use. This is effected by way of a separate filling opening 21, which is closed, after gas filling has taken place, for example with a pressed-in ball. For the damping of the displacement movement when the blocking valve is opened, a damper piston 20 is provided which comprises at least one small passage opening for the gas filling in the gas chamber 19, which opening effects the damping.

Specific forms of embodiment of the invention have been represented and described in order to illustrate the use of the principles of the invention. Of course, the invention can also be realized in other ways without departing from these principles.

The reference numbers in the claims serve only for facilitation of understanding and are not to be understood as a limitation.

I claim:

1. A hydraulically blockable gas spring comprising a cylinder member (1) having an axis, a hydraulic fluid chamber (11,12) being confined within said cylinder member (1), said hydraulic fluid chamber (11,12) having a first end and a second end axially opposite each other, an axially extending first piston rod section (2) being sealingly guided through said first end of said hydraulic fluid chamber (11,12), said first piston rod section (2) being connected with a piston member (3) within said hydraulic fluid chamber (11,12), said first piston rod section (2) and said piston member (3) providing a piston rod-piston unit (2,3,14) axially movable with respect to said cylinder member (1), said piston member (3) defining two hydraulic fluid compartments (11,12) within said hydraulic fluid chamber (11,12), said hydraulic fluid compartments (11,12) being interconnectable by hydraulic fluid passage means (8,10), a valve unit (6) being allocated to said hydraulic fluid passage means (8,10) for selectively opening and closing said hydraulic fluid passage means (8,10), said valve unit (6) being actuatable by external actuating means (7) from outside said hydraulic fluid chamber (11,12), said piston rod-piston unit (2,3,14) being subject to the biasing action of a volume of pressurized gas, said volume of pressurized gas being confined within a gas chamber (19) adjacent said second end of said hydraulic fluid chamber (11,12), said gas chamber (19) being separated from said hydraulic fluid chamber (11,12) by a separating wall (17), said separating wall (17) being axially fixed with respect to said cylinder member (1), said piston rod-piston unit (2,3,14) being provided with a second piston rod section (14) sealingly guided through said separating wall (17), said second piston rod section (14) being exposed to the pressure of pressurized gas within said gas chamber (19).

2. A gas spring as set forth in claim 1, said hydraulic fluid passage means (8,10) extending through said piston rod-piston unit (2,3,14).

3. A gas spring as set forth in claim 2, said valve unit (6) being actuatable via an axial bore extending through said first piston rod section (2).

4. A gas spring as set forth in claim 1, said gas chamber (19) being accommodated within said cylinder member (1).

5. A gas spring as set forth in claim 1, said separating wall (17) being axially fixed within said cylinder member (1) by radially inwardly directed deformations (30,31) of said cylinder member (1).

6. A gas spring as set forth in claim 1, said second piston rod section (14) being provided with a damper piston (20) within said gas chamber (19).

7. A gas spring as set forth in claim 1, a separate filling opening (21) being provided for filling said gas chamber (19) with pressurized gas.

8. A gas spring as set forth in claim 1, said gas chamber (19) being accommodated within said cylinder member (1), said gas chamber (19) being closed at an end thereof axially remote from said separating wall (17) by a closure member connected with said cylinder member (1), said closure member being provided with a filling opening (21).

9. A gas spring as set forth in claim 8, said closure member being provided with a fastening element for fastening said gas spring to a respective construction.

10. A gas spring as set forth in claim 1, said second piston rod section (14) being separate from said first piston rod section (2) and being secured to said piston member (3).

11. A gas spring as set forth in claim 10, said second piston rod section (14) having an end portion (26) being received within an axially directed bore (13a) of said piston member (3).

12. A gas spring as set forth in claim 11, said hydraulic fluid passage means (8,10) extending through said axially directed bore (13a), said end portion (26) of said second piston rod section (14) resting on a spacer sleeve (15) within said axially directed bore (13a), said spacer sleeve (15) being provided with radial bores, said radial bores forming part of said hydraulic fluid passage means (8,10).

13. A gas spring as set forth in claim 12, said valve unit (6) comprising a valve member (6) received by an axially directed valve channel provided within said piston member (3) and opening into said axially directed bore (13a), a sealing element (9) surrounding said valve member (6), said sealing element (9) being axially fixed within said piston member (3) by an abutment plate (16), said abutment plate (16) being axially fixed by said spacer sleeve (15).

14. A gas spring as set forth in claim 1,. said first and second piston rod section (2,14) having identic diameter.

* * * * *